(12) United States Patent
Huang et al.

(10) Patent No.: US 10,891,397 B2
(45) Date of Patent: Jan. 12, 2021

(54) USER INTERFACE DISPLAY METHOD FOR TERMINAL, AND TERMINAL

(71) Applicant: Huawei Technologies Co., Ltd., Shenzhen (CN)

(72) Inventors: Xi Huang, Shenzhen (CN); Zuoqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 15/570,145

(22) PCT Filed: Apr. 30, 2015

(86) PCT No.: PCT/CN2015/078040
§ 371 (c)(1),
(2) Date: Oct. 27, 2017

(87) PCT Pub. No.: WO2016/172944
PCT Pub. Date: Nov. 3, 2016

(65) Prior Publication Data
US 2018/0121681 A1   May 3, 2018

(51) Int. Cl.
*G06F 21/00* (2013.01)
*G06F 21/74* (2013.01)
*G06F 21/62* (2013.01)
*G06F 21/83* (2013.01)
*G06F 21/84* (2013.01)

(52) U.S. Cl.
CPC .............. *G06F 21/74* (2013.01); *G06F 21/62* (2013.01); *G06F 21/83* (2013.01); *G06F 21/84* (2013.01)

(58) Field of Classification Search
CPC .......... G06F 21/74; G06F 21/83; G06F 21/84; G06F 21/62
See application file for complete search history.

(56) References Cited

U.S. PATENT DOCUMENTS

| | | | |
|---|---|---|---|
| 9,471,799 B2 * | 10/2016 | Schiffman | ............... G06F 21/62 |
| 2005/0262449 A1 | 11/2005 | Anderson et al. | |
| 2005/0283359 A1 * | 12/2005 | Lin | ......................... G06F 9/454 704/8 |
| 2010/0013974 A1 | 1/2010 | Gay | |

(Continued)

FOREIGN PATENT DOCUMENTS

| | | |
|---|---|---|
| CN | 101291226 A | 10/2008 |
| CN | 101410774 A | 4/2009 |

(Continued)

*Primary Examiner* — Shewaye Gelagay
*Assistant Examiner* — Michael M Lee
(74) *Attorney, Agent, or Firm* — Slater Matsil, LLP

(57) ABSTRACT

Embodiments provide a user interface display method for a terminal, and a terminal. The method includes: generating, by a terminal in a first operating environment, a first user interface that includes a first input component, obtaining a first user interface picture according to the first user interface, and determining attribute information of the first input component according to a first application. The method also includes switching, by the terminal, to a second operating environment, and displaying a second user interface in the second operating environment according to the first user interface picture and the attribute information of the first input component, thereby reducing processing overheads of the terminal.

15 Claims, 8 Drawing Sheets

(56) References Cited

U.S. PATENT DOCUMENTS

| | | | |
|---|---|---|---|
| 2012/0216291 A1* | 8/2012 | Chueh | G06F 21/36 |
| | | | 726/27 |
| 2012/0278443 A1 | 11/2012 | Taniuchi et al. | |
| 2013/0145475 A1* | 6/2013 | Ryu | G06F 21/31 |
| | | | 726/26 |
| 2013/0263215 A1 | 10/2013 | Ekdahl | |
| 2014/0344941 A1 | 11/2014 | Sibert et al. | |
| 2015/0294433 A1* | 10/2015 | Ye | G06T 1/0007 |
| | | | 345/418 |
| 2016/0092877 A1* | 3/2016 | Chew | G06Q 20/4012 |
| | | | 705/72 |
| 2017/0104511 A1* | 4/2017 | Roehrle | H04B 5/00 |
| 2017/0270506 A1* | 9/2017 | Zhou | G06F 3/017 |

FOREIGN PATENT DOCUMENTS

| | | | |
|---|---|---|---|
| CN | 101430642 A | 5/2009 |
| CN | 103714459 A | 4/2014 |
| CN | 104102876 A | 10/2014 |
| CN | 104376274 A | 2/2015 |
| EP | 2492835 A1 | 8/2012 |
| EP | 2648129 A1 | 10/2013 |

\* cited by examiner

USER INTERFACE DISPLAY METHOD FOR TERMINAL, AND TERMINAL

CROSS-REFERENCE TO RELATED APPLICATIONS

This application is a national stage of International Application No. PCT/CN2015/078040, filed on Apr. 30, 2015, which is hereby incorporated by reference in its entirety.

TECHNICAL FIELD

The present invention relates to communications technologies, and in particular, to a user interface display method for a terminal, and a terminal.

BACKGROUND

Currently, switching between different applications on a terminal is basically seamless switching, in which only an activity is switched. This provides an opportunity for a malicious application to hijack a current foreground activity. That is, when detecting that a target application process starts, the malicious application switches to the foreground and overwrites a target application user interface with a false user interface. To protect account security of a user in scenarios such as login and transaction and prevent activity hijacking, a trusted user interface (TUI for short) in a trusted execution environment (TEE for short) needs to be used. That is, a trusted operating system (Trusted OS) needs to be deployed on a terminal to enhance overall security of a mobile intelligent terminal. The mobile intelligent terminal on which a TEE is deployed is divided into two operating systems architecturally: a rich operating system (Rich OS) corresponding to a rich execution environment (REE for short), and a trusted OS corresponding to the TEE. A client application (CA for short) is deployed in the Rich OS, and a trusted application (TA for short) corresponding to the CA is deployed in the trusted OS. A security-sensitive operation (such as an operation of entering a payment password or an account login password) by a user in the CA is transferred to the TA for execution. That is, when the user executes the security-sensitive operation in a user interface in a non-trusted environment (REE), the terminal switches to a trusted environment (TEE), so that the user can execute the security-sensitive operation in a TUI user interface generated in the TEE. Because security of the TA that runs in the TEE is higher than security of the CA that runs in the REE, the security-sensitive operation of the user can be protected against attacks.

As a highly simplified operating system, the TEE has very few software and hardware resources. Chinese characters in a username, a password, or a transaction amount displayed by a terminal in a user interface of the REE also need to be displayed in the TEE. That is, the TEE also needs to support display of Chinese characters. Therefore, a huge Chinese font (whose size is generally about 10-20 M) is required. However, when the terminal runs in the TEE, generally only a relatively small amount of memory is allocated to the TEE. Therefore, even if the terminal renders the TUI user interface successfully in a scenario in which the TEE lacks resources, a subsequent system response speed and a processor speed of the terminal in the TEE may be reduced drastically.

To resolve the foregoing problems, a Chinese font in the Rich OS is loaded into shared memory of the TEE and the REE in a memory sharing manner in the prior art. When the TA in the TEE needs to display the trusted user interface, the TA can display a Chinese character in the trusted user interface by invoking the Chinese font in the shared memory. In addition, because fonts of English characters and digits are not large, an English font and a datafont may be stored in memory of the TEE. When the TA in the TEE needs to display the trusted user interface, the TA can display a digit or English in the trusted user interface by invoking the Chinese font or the English font in the memory of the TEE.

However, in the prior art, a large amount of shared memory is required, and the terminal needs to manage the large amount of shared memory, so that processing in the TEE becomes complex. In addition, in the prior art, as perceived by the user, the trusted user interface displayed in the TEE is highly uncoordinated with the user interface displayed in the REE, and human-machine interaction is not intelligent enough.

SUMMARY

A user interface display method for a terminal, and a terminal that are provided in embodiments of the present invention are used to resolve the following technical problem in the prior art: Because a large amount of shared memory is occupied during rendering of a TUI user interface, processing in a TEE becomes complex, and processing overheads of a terminal are high; and additionally resolve the following technical problem in the prior art: As perceived by a user, a trusted user interface displayed in the TEE is highly uncoordinated with a user interface displayed in an REE, and human-machine interaction is not intelligent enough.

According to a first aspect, an embodiment of the present invention provides a user interface display method for a terminal, where a first operating environment and a second operating environment are deployed on the terminal. The method includes: generating, by the terminal, a first user interface in the first operating environment, where the first user interface includes a first input component, and the first user interface is a user interface related to a first application that runs in the first operating environment. The method also includes obtaining, by the terminal, a first user interface picture according to the first user interface, and determining attribute information of the first input component according to the first application, where the attribute information of the first input component includes a location and/or a size of the first input component in the first user interface. The method also includes switching, by the terminal, from the first operating environment to the second operating environment, and displaying a second user interface in the second operating environment according to the first user interface picture and the attribute information of the first input component, where the second user interface includes the first user interface picture and a second input component located on the first user interface picture, and the second input component is generated by the terminal according to the attribute information of the first input component and is used to receive an input of a user in the second operating environment.

With reference to the first aspect, in a first possible implementation manner of the first aspect, the generating, by the terminal, a first user interface in the first operating environment includes: generating, by the terminal, a first user interface in a displayed state in the first operating environment; or generating, by the terminal, a first user interface in an invisible state in the first operating environment.

With reference to the first possible implementation manner of the first aspect, in a second possible implementation manner of the first aspect, if the terminal generates the first user interface in the displayed state in the first operating environment, the obtaining, by the terminal, a first user interface picture according to the first user interface, and determining attribute information of the first input component according to the first application includes: receiving, by the terminal, a first operation of the user in the first user interface in the first operating environment; determining, by the terminal, whether the first operation is an operation of requesting to input in the first input component; and if the first operation is an operation of requesting to input in the first input component, obtaining, by the terminal, the first user interface picture according to the first user interface, and determining the attribute information of the first input component according to the first application.

With reference to any one of the first aspect to the second possible implementation manner of the first aspect, in a third possible implementation manner of the first aspect, the first user interface picture includes an overall screenshot of the first user interface or a partial screenshot of the first user interface.

With reference to the third possible implementation manner of the first aspect, in a fourth possible implementation manner of the first aspect, the second input component does not include a Chinese character, and the input of the user does not include a Chinese character.

With reference to any one of the first aspect to the fourth possible implementation manner of the first aspect, in a fifth possible implementation manner of the first aspect, after the displaying, by the terminal, a second user interface in the second operating environment, the method further includes: receiving, by the terminal, an input of the user in the second input component in the second operating environment; switching, by the terminal, from the second operating environment to the first operating environment, and sending the input to a server for verification; and receiving, by the terminal, a first verification result of the server.

With reference to any one of the second possible implementation manner of the first aspect to the fourth possible implementation manner of the first aspect, in a sixth possible implementation manner of the first aspect, the first user interface further includes a third input component, the third input component is used to receive first information that is entered by the user, and the method further includes: obtaining, by the terminal, the first information after determining that the first operation is an operation of requesting to input in the first input component.

With reference to the sixth possible implementation manner of the first aspect, in a seventh possible implementation manner of the first aspect, after the displaying, by the terminal, a second user interface in the second operating environment, the method further includes: receiving, by the terminal, an input of the user in the second input component in the second operating environment; and verifying, by the terminal, a user identity in the second operating environment according to the input and the first information, to obtain a second verification result.

With reference to any one of the second possible implementation manner of the first aspect to the fourth possible implementation manner of the first aspect, in an eighth possible implementation manner of the first aspect, the first user interface further includes transaction amount information in a visible state, and the method further includes: after the terminal determines that the first operation is an operation of requesting to input in the first input component, obtaining, by the terminal, actual transaction amount information corresponding to the transaction amount information displayed in the first user interface.

With reference to the eighth possible implementation manner of the first aspect, in a ninth possible implementation manner of the first aspect, the switching, by the terminal, to the second operating environment, and displaying a second user interface in the second operating environment according to the first user interface picture and the attribute information of the first input component specifically includes: switching, by the terminal, from the first operating environment to the second operating environment, and displaying the second user interface in the second operating environment according to the first user interface picture, the attribute information of the first input component, and the actual transaction amount information, where the second user interface includes the first user interface picture, the second input component located on the first user interface picture, and the actual transaction amount information.

According to a second aspect, an embodiment of the present invention provides a terminal, where a first operating environment and a second operating environment are deployed on the terminal. The terminal includes: a generation module, configured to generate a first user interface in the first operating environment, where the first user interface includes a first input component, and the first user interface is a user interface related to a first application that runs in the first operating environment. The terminal also includes an obtaining module, configured to obtain a first user interface picture according to the first user interface, and determine attribute information of the first input component according to the first application, where the attribute information of the first input component includes a location and/or a size of the first input component in the first user interface. The terminal also includes a processing module, configured to switch the terminal from the first operating environment to the second operating environment. The terminal also includes a display module, configured to display a second user interface in the second operating environment according to the first user interface picture and the attribute information of the first input component, where the second user interface includes the first user interface picture and a second input component located on the first user interface picture, and the second input component is generated by the terminal according to the attribute information of the first input component and is used to receive an input of a user in the second operating environment.

With reference to the second aspect, in a first possible implementation manner of the second aspect, the generation module is specifically configured to generate a first user interface in a displayed state in the first operating environment; or generate, by the terminal, a first user interface in an invisible state in the first operating environment.

With reference to the first possible implementation manner of the second aspect, in a second possible implementation manner of the second aspect, If the generation module generates the first user interface in the displayed state in the first operating environment, the obtaining module specifically includes: an input unit, configured to receive a first operation of the user in the first user interface in the first operating environment; a determining unit, configured to determine whether the first operation is an operation of requesting to input in the first input component; and an obtaining unit, configured to: after the determining unit determines that the first operation is an operation of requesting to input in the first input component, obtain the first user interface picture according to the first user interface, and determine attribute information of the first input component according to the first application.

With reference to any one of the second aspect to the second possible implementation manner of the second aspect, in a third possible implementation manner of the second aspect, the first user interface picture includes an overall screenshot of the first user interface or a partial screenshot of the first user interface.

With reference to the third possible implementation manner of the second aspect, in a fourth possible implementation manner of the second aspect, the second input component does not include a Chinese character, and the input of the user does not include a Chinese character.

With reference to any one of the second aspect to the fourth possible implementation manner of the second aspect, in a fifth possible implementation manner of the second aspect, the terminal further includes an input module, a receiving module, and a sending module; the input module is configured to receive an input of the user in the second input component in the second operating environment after the display module displays the second user interface in the second operating environment; the sending module is configured to send the input to a server for verification after the processing module switches the terminal from the second operating environment to the first operating environment; and the receiving module is further configured to receive a first verification result of the server.

With reference to any one of the second possible implementation manner of the second aspect to the fourth possible implementation manner of the second aspect, in a sixth possible implementation manner of the second aspect, the first user interface further includes a third input component, the third input component is used to receive first information that is entered by the user; and the obtaining unit is further configured to obtain the first information after the determining unit determines that the first operation is an operation of requesting to input in the first input component.

With reference to the sixth possible implementation manner of the second aspect, in a seventh possible implementation manner of the second aspect, the input unit is further configured to receive an input of the user in the second input component in the second operating environment after the display module displays the second user interface in the second operating environment; and the obtaining unit is further configured to verify a user identity in the second operating environment according to the input and the first information, to obtain a second verification result.

With reference to any one of the second possible implementation manner of the second aspect to the fourth possible implementation manner of the second aspect, in an eighth possible implementation manner of the second aspect, the first user interface further includes transaction amount information in a visible state; and the obtaining unit is further configured to: after the determining unit determines that the first operation is an operation of requesting to input in the first input component, obtain actual transaction amount information corresponding to the transaction amount information displayed in the first user interface.

With reference to the eighth possible implementation manner of the second aspect, in a ninth possible implementation manner of the second aspect, the display module is specifically configured to: after the processing module switches the terminal from the first operating environment to the second operating environment, display the second user interface in the second operating environment according to the first user interface picture, the attribute information of the first input component, and the actual transaction amount information, where the second user interface includes the first user interface picture, the second input component located on the first user interface picture, and the actual transaction amount information.

According to a third aspect, an embodiment of the present invention provides a terminal, where a first operating environment and a second operating environment are deployed on the terminal. The terminal includes a processor, configured to: generate a first user interface in the first operating environment, obtain a first user interface picture according to a first user interface, and after determining attribute information of a first input component according to a first application, switch the terminal from the first operating environment to the second operating environment, where the first user interface includes the first input component, the first user interface is a user interface related to the first application that runs in the first operating environment, and the attribute information of the first input component of the terminal includes a location and/or a size of the first input component in the first user interface. The terminal also includes a display, configured to display a second user interface in the second operating environment according to the first user interface picture and the attribute information of the first input component, where the second user interface includes the first user interface picture and a second input component located on the first user interface picture, and the second input component is generated by the processor according to the attribute information of the first input component and is used to receive an input of a user in the second operating environment.

With reference to the third aspect, in a first possible implementation manner of the third aspect, the processor is specifically configured to generate a first user interface in a displayed state in the first operating environment; or generate, by the terminal, a first user interface in an invisible state in the first operating environment.

With reference to the first possible implementation manner of the third aspect, in a second possible implementation manner of the third aspect, If the processor module generates the first user interface in the displayed state in the first operating environment, the terminal further includes an input device; the input device is configured to receive a first operation of the user in the first user interface in the first operating environment; and the processor is specifically configured to: determine whether the first operation is an operation of requesting to input in the first input component, and if the first operation is an operation of requesting to input in the first input component, obtain the first user interface picture according to the first user interface, and determine attribute information of the first input component according to the first application.

With reference to any one of the third aspect to the second possible implementation manner of the third aspect, in a third possible implementation manner of the third aspect, the first user interface picture includes an overall screenshot of the first user interface or a partial screenshot of the first user interface.

With reference to the third possible implementation manner of the third aspect, in a fourth possible implementation manner of the third aspect, the second input component does not include a Chinese character, and the input of the user does not include a Chinese character.

With reference to any one of the third aspect to the fourth possible implementation manner of the third aspect, in a fifth possible implementation manner of the third aspect, the terminal further includes an input device, a receiver, and a sender; the input device is configured to receive an input of the user in the second input component in the second operating environment after the display displays the second user interface in the second operating environment; the sender is configured to send the input to a server for verification after the processor switches the terminal from the second operating environment to the first operating environment; and the receiver is further configured to receive a first verification result of the server.

With reference to any one of the second possible implementation manner of the third aspect to the fourth possible implementation manner of the third aspect, in a sixth possible implementation manner of the third aspect, the first user interface further includes a third input component, the third input component is used to receive first information that is entered by the user; and the processor is further configured to obtain the first information after determining that the first operation is an operation of requesting to input in the first input component.

With reference to the sixth possible implementation manner of the third aspect, in a seventh possible implementation manner of the third aspect, the input device is further configured to receive an input of the user in the second input component in the second operating environment after the display displays the second user interface in the second operating environment; the processor is further configured to verify a user identity in the second operating environment according to the input and the first information, to obtain a second verification result.

With reference to any one of the second possible implementation manner of the third aspect to the fourth possible implementation manner of the third aspect, in an eighth possible implementation manner of the third aspect, the first user interface further includes transaction amount information in a visible state; and the processor is further configured to: after determining that the first operation is an operation of requesting to input in the first input component, obtain actual transaction amount information corresponding to the transaction amount information displayed in the first user interface.

With reference to the eighth possible implementation manner of the third aspect, in a ninth possible implementation manner of the third aspect, the display is specifically configured to: after the processor switches the terminal from the first operating environment to the second operating environment, display the second user interface in the second operating environment according to the first user interface picture, the attribute information of the first input component, and the actual transaction amount information, where the second user interface includes the first user interface picture, the second input component located on the first user interface picture, and the actual transaction amount information.

According to the user interface display method for a terminal, and the terminal that are provided in the embodiments of the present invention, a terminal generates, in a first operating environment, a first user interface that includes a first input component, and obtains a first user interface picture according to the first user interface, determines attribute information of the first input component according to a first application, and then switches to a second operating environment and displays a second user interface according to the first user interface picture and the attribute information of the first input component. The second user interface includes the first user interface picture and a second input component located on the first user interface picture. According to the method provided in the embodiments of the present invention, shared memory occupied by a Chinese font in the prior art when the second user interface is rendered in the second operating environment is reduced drastically. In addition, because the first user interface picture is real mapping from the first user interface in the first operating environment and may be exactly the same as the first user interface in terms of similarity, the first user interface displayed in the first operating environment in this embodiment is highly restored when being displayed in the second operating environment. In this way, the user interfaces perceived by a user are relatively consistent, and intelligence of human-machine interaction is improved.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A terminal mentioned in the embodiments of the present invention may be any portable mobile terminal, including but not limited to a mobile phone, a mobile computer, a tablet, a personal digital assistant (PDA), a media player, a smart television, a smart watch, smart glasses, and a smart band; or may include devices such as an automatic teller machine (ATM). This is not limited in the embodiments of the present invention.

A method mentioned in the embodiments of the present invention is intended to resolve the following technical problem in the prior art. Because a large amount of shared memory is occupied during rendering of a TUI user interface in a TEE, processing of a terminal in the TEE becomes complex, and processing overheads are increased. In addition, the method mentioned in the embodiments of the present invention can also resolve the following technical problem in the prior art: As perceived by a user, a trusted user interface displayed in the TEE is highly uncoordinated with a user interface displayed in an REE (that is, when the user interface in the REE is redisplayed in the TEE, a shape of a user interface control, a display effect of the user interface control, luminance and the like are perceptually inconsistent), and human-machine interaction is not intelligent enough.

The following describes technical solutions of the present invention in detail by using specific embodiments. The following specific embodiments may be mutually combined, and same or similar concepts or processes may not be repeatedly described in some embodiments.

Figure 1:
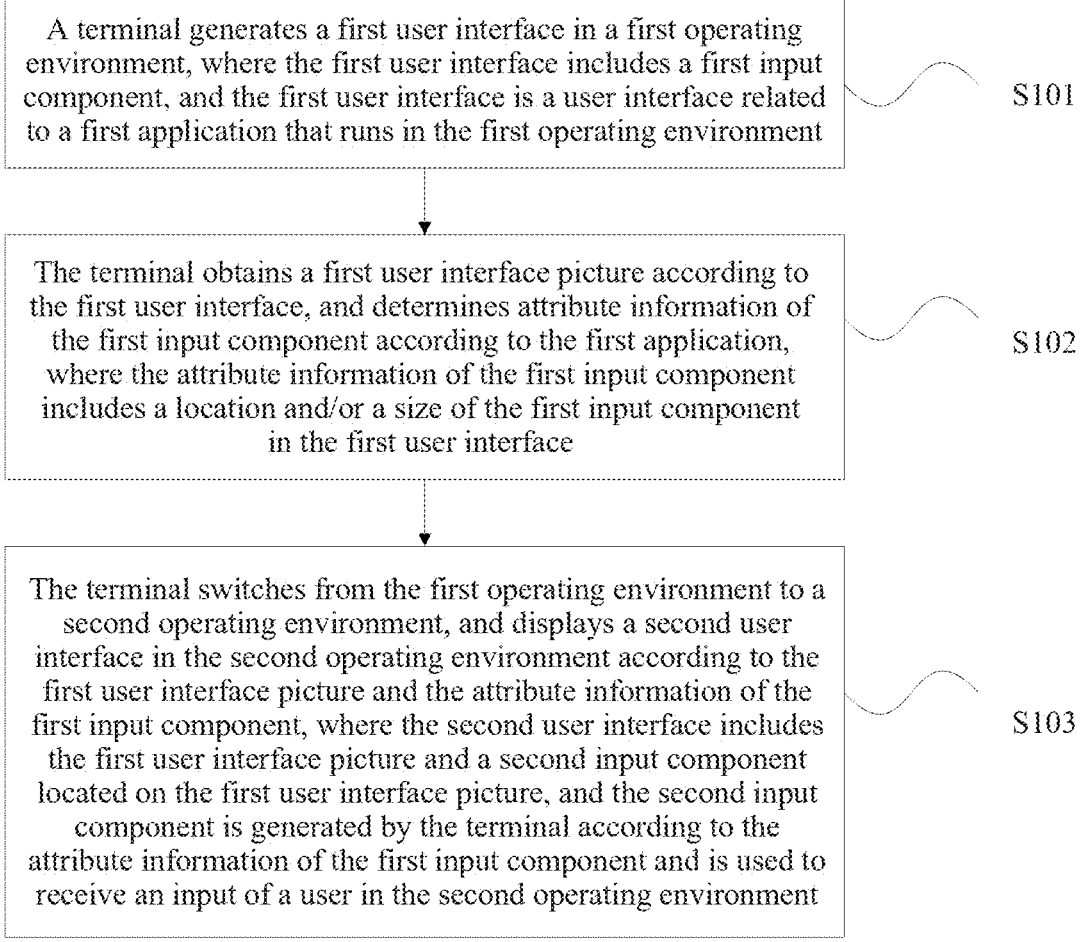
FIG. 1 is a schematic flowchart of Embodiment 1 of a user interface display method for a terminal according to the present invention.

FIG. 1 is a schematic flowchart of Embodiment 1 of a user interface display method for a terminal according to the present invention. This embodiment relates to a specific process in which a terminal generates a first user interface picture according to a first user interface in a first operating environment, displays the first user interface picture in a second operating environment, and renders a second user interface on the first user interface picture according to the first user interface picture. The second user interface is used to receive an input of a user. As shown in FIG. 1, the method includes the following steps.

S101. A terminal generates a first user interface in the first operating environment, where the first user interface includes a first input component, and the first user interface is a user interface related to a first application that runs in the first operating environment.

Specifically, both the first operating environment and a second operating environment are deployed on the terminal mentioned in this embodiment of the present invention. It should be noted that the first operating environment may be a rich execution environment (REE), and the second operating environment may be a trusted execution environment (TEE). An application that runs in the REE may be referred to as a CA, and an application that runs in the TEE may be referred to as a TA. That is, a security-sensitive operation (such as an operation of entering a payment password or an account login password) by a user in the CA is transferred to the TA for execution. That is, when the user executes the security-sensitive operation in a user interface in a non-trusted environment, the terminal switches to a trusted environment, so that the user can execute the security-sensitive operation in a TUI user interface generated in the trusted environment.

When the terminal runs in the first operating environment, if the user opens the first application on the terminal, the terminal generates the first user interface according to a corresponding configuration file of the first application. The first user interface may include the first input component that is used to receive some security-sensitive inputs of the user, for example, sensitive information such as a password, a verification code, and an identity card number that are entered by the user. For example, when the user opens the application "Taobao", a commodity selection user interface is displayed. After selecting a commodity in the user interface, the user clicks/taps a "buy" component, and the terminal generates a payment user interface accordingly. The payment user interface may include an input area for security-sensitive information of the user. Therefore, the payment user interface is the first user interface mentioned in this embodiment of the present invention.

S102. The terminal obtains a first user interface picture according to the first user interface, and determines attribute information of the first input component according to the first application, where the attribute information of the first input component includes a location and/or a size of the first input component in the first user interface.

Specifically, after generating the first user interface, the terminal obtains the first user interface picture according to the first user interface. Optionally, a screenshot of the first user interface may be used directly as the first user interface picture by performing a corresponding screenshot operation on the terminal, or picture generation software on the terminal may be used to convert the first user interface into the first user interface picture. In another aspect, the first user interface is a user interface related to the first application that runs in the first operating environment on the terminal, and the first application has a corresponding configuration file. Therefore, the terminal can determine the attribute information of the first input component according to the configuration file of the first application. Optionally, the attribute information of the first input component may be a size of the first input component, or may be a location of the first input component in the first user interface, or may be both a size of the first input component and a location of the first input component in the first user interface, or may be other attributes such as a shape or a color of the first input component.

S103. The terminal switches from the first operating environment to the second operating environment, and displays a second user interface in the second operating environment according to the first user interface picture and the attribute information of the first input component, where the second user interface includes the first user interface picture and a second input component located on the first user interface picture, and the second input component is generated by the terminal according to the attribute information of the first input component and is used to receive an input of a user in the second operating environment.

Specifically, after the terminal generates the first user interface picture, the terminal switches from the first operating environment to the second operating environment. It should be noted that "switching" mentioned herein may be: a processor on the terminal currently runs in the second operating environment, or may be: current user interface display of the terminal is controlled by the second operating environment. In this step, when the terminal switches from the first operating environment to the second operating environment, the first user interface picture equivalently switches from the first operating environment to the second operating environment. Optionally, the first user interface picture may be located in memory of the second operating environment, or may be located in shared memory of the first operating environment and the second operating environment.

Subsequently, the terminal may invoke the first user interface picture from the shared memory or the memory of the second operating environment, and display the first user interface picture in the second operating environment. At the same time, the terminal generates the second input component according to the attribute information of the first input component, and displays the second input component on the first user interface picture to form the second user interface. The second input component is used to receive an input of the user in the second operating environment. That is, the second user interface includes the first user interface picture at a lower layer and the second input component on the first user interface picture.

In the prior art, after generating the first user interface in the first operating environment, the terminal invokes a Chinese font in the shared memory and a digit or English font in the second operating environment, so as to reconstruct the first user interface in the second operating environment to obtain the second user interface, thereby ensuring security of the user input. Therefore, a large amount of shared memory is required for storing the Chinese font in the prior art. However, in this embodiment of the present invention, after generating the first user interface in the first operating environment, the terminal generates the first user interface picture directly. The first user interface picture may be located in the shared memory, or may be located in the memory of the second operating environment. When the first user interface picture is located in the shared memory, because the first user interface picture is data in a "picture" format, the first user interface picture occupies a much smaller portion of the shared memory than the Chinese font. When the first user interface picture is located in the memory of the second operating environment, because the first user interface picture is data in a "picture" format, the first user interface picture occupies only a small portion of the memory of the second operating environment, and does not occupy the shared memory. That is, no matter whether the first user interface picture is located in the shared memory or located in the memory of the second operating environment, the first user interface picture does not occupy a large amount of shared memory or may not occupy the shared memory at all. Therefore, processing of the terminal in the TEE is simplified, and processing overheads of the terminal are reduced. In another aspect, because the first user interface picture is included in the second user interface, and the first user interface picture is real mapping from the first user interface in the first operating environment and can be exactly the same as the first user interface in terms of similarity, the first user interface displayed in the first operating environment in this embodiment is highly restored when being displayed in the second operating environment. In this way, the user interfaces perceived by a user are relatively consistent, and human-machine interaction is relatively intelligent.

According to the user interface display method for a terminal provided in this embodiment of the present invention, a terminal generates, in a first operating environment, a first user interface that includes a first input component, obtains a first user interface picture according to the first user interface, and after determining attribute information of the first input component according to a first application, switches to a second operating environment and displays a second user interface according to the first user interface picture and the attribute information of the first input component. The second user interface includes the first user interface picture and a second input component located on the first user interface picture. According to the method provided in this embodiment of the present invention, shared memory occupied by a Chinese font in the prior art when the second user interface is rendered in the second operating environment is reduced drastically. In addition, because the first user interface picture is real mapping from the first user interface in the first operating environment and may be exactly the same as the first user interface in terms of similarity, the first user interface displayed in the first operating environment in this embodiment is highly restored when being displayed in the second operating environment. In this way, the user interfaces perceived by a user are relatively consistent, and intelligence of human-machine interaction is improved.

Optionally, the first user interface generated by the terminal in first operating environment may be in a displayed state, or may be in an invisible state.

In a possible implementation manner of the present invention, this embodiment relates to a specific process in which the terminal obtains the first user interface picture and the attribute information of the first input component when the first user interface generated by the terminal in the first operating environment is in the displayed state. On the basis of the foregoing embodiment, in the implementation manner shown in FIG. 2, S102 specifically includes the following steps.

S201. The terminal receives a first operation of the user in the first user interface in the first operating environment.

Specifically, after the terminal generates the first user interface, the first user interface is displayed on the terminal, and the user may perform the first operation on the first user interface. Optionally, the first operation may be a touch operation, a slide operation, a click/tap operation, or the like at any location in the first user interface.

S202. The terminal determines whether the first operation is an operation of requesting to input in a first input component, and if the first operation is an operation of requesting to input in the first input component, the terminal obtains the first user interface picture according to the first user interface, and determines the attribute information of the first input component according to the first application.

Figure 3:
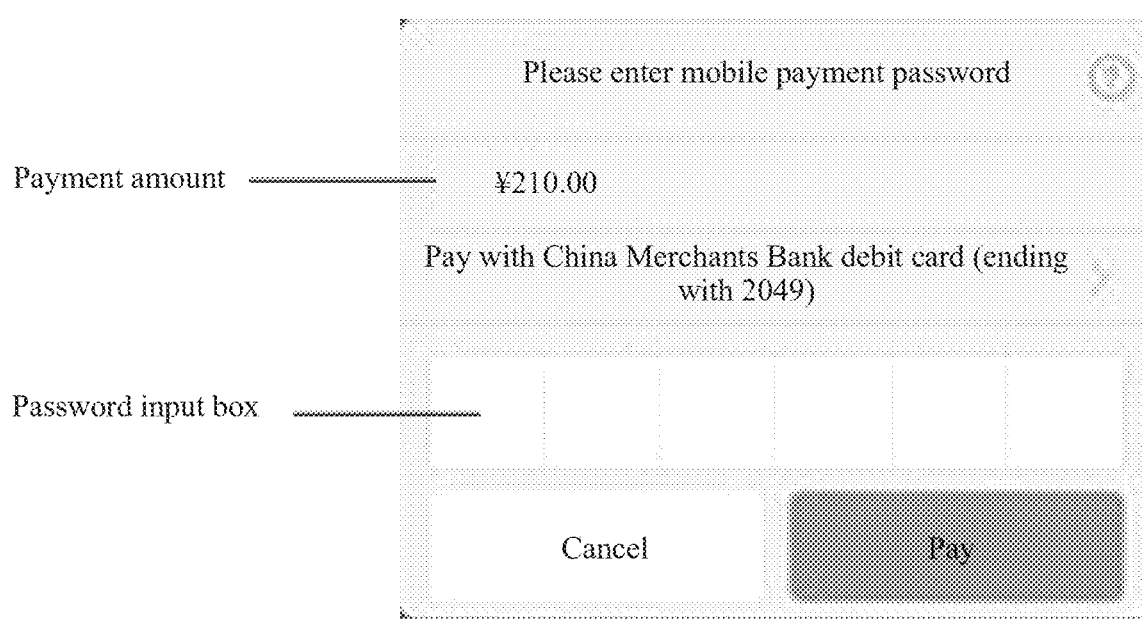
FIG. 3 is a schematic diagram of a first user interface according to an embodiment of the present invention.

Specifically, when the terminal detects the first operation of the user in the first user interface, the terminal determines whether the first operation is an operation of requesting to input in the first input component. For example, when the first user interface is shown in FIG. 3, and when the user clicks/taps a payment amount in FIG. 3, the terminal determines that the first operation is not an operation of requesting to input in the first input component; and when the user clicks/taps a password input box in FIG. 3, the terminal determines that the first operation is an operation of requesting to input in the first input component. Optionally, the first input component in the first user interface may be understood as a control for receiving a security-sensitive information input of the user.

When the terminal determines that the first operation is an operation of requesting to input in the first input component, the terminal obtains the first user interface picture according to the displayed first user interface, and determines the attribute information of the first input component in the displayed first user interface according to the configuration file of the first application. Optionally, the first user interface picture may be an overall screenshot of the first user interface or a partial screenshot of the first user interface.

Further, after obtaining the first user interface picture and the attribute information of the first input component, the terminal switches to the second operating environment. This is actually equivalent to a process in which an application in the first operating environment on the terminal establishes a session connection to an application in the second operating environment, and transfers the first user interface picture and the attribute information of the first input component to the application in the second operating environment, while for the terminal, such information transmission inside the terminal may be regarded as a process of switching operating environments of the terminal.

In another possible implementation manner of the present invention, this embodiment relates to a specific process in which the terminal obtains the first user interface picture and the attribute information of the first input component when the first user interface generated by the terminal in the first operating environment is not displayed.

Specifically, in this embodiment, when the terminal generates the first user interface according to the configuration file of the first application on the terminal, the terminal may not display the first user interface. That is, the first user interface is invisible to the user. However, the first user interface actually exists at a bottom layer of the terminal (optionally, the bottom layer may be a memory or a video RAM of the terminal). After generating the first user interface, the terminal may obtain the first user interface picture directly according to the first user interface. Optionally, the first user interface picture may be an overall screenshot of the first user interface or a partial screenshot of the first user interface. Subsequently, the terminal stores the first user interface picture into the shared memory or the memory of the second operating environment, and obtains the attribute information of the first input component in the first user interface according to the configuration file of the first application. Then the terminal switches to the second operating environment, and generates the second user interface according to the obtained first user interface picture and the obtained attribute information of the first input component. For better understanding of this embodiment, a simple example is given herein for description:

It is assumed that the terminal currently displays a commodity selection user interface, and the user selects a garment in the user interface and clicks/taps "buy". According to the foregoing first possible implementation manner, a payment user interface (that is, the first user interface) of Alipay needs to be first displayed in the first operating environment, and then a screenshot (that is, the first user interface picture) is generated according to the payment user interface (that is, the first user interface). However, in this embodiment, after the "buy" key is clicked/tapped, no payment user interface is displayed, but the screenshot (the first user interface picture) is directly generated according to the payment user interface (that is, the first user interface) of Alipay at the bottom layer, and then the terminal switches to the second operating environment (that is, sends the screenshot to the second operating environment), and constructs the second user interface in the second operating environment.

Further, on the basis of all the foregoing embodiments, in a third possible implementation manner of the present invention, when the second input component in the second user interface generated by the terminal according to the determined first user interface picture and the determined attribute information of the first input component does not include a Chinese character, and the input of the user does not include a Chinese character, constructing the second user interface in this embodiment of the present invention may not require any Chinese font (the first user interface in the first operating environment needs to be displayed in the second operating environment, a first user interface picture is generated directly according to the first user interface in this embodiment, and the first user interface picture is displayed directly in the second operating environment, and therefore, no matter whether the first user interface includes a Chinese character, no Chinese font needs to be loaded for displaying the first user interface picture, and no Chinese font is required for displaying the second input component located on the first user interface picture). However, in the prior art, even if the second input component does not include a Chinese character, and the input of the user does not include a Chinese character, because the first user interface in the first operating environment needs to be displayed in the second operating environment, a Chinese font needs to be loaded, the terminal needs to set a load program in the second operating environment, and processing complexity of the terminal is relatively high. Therefore, according to the method provided in this embodiment of the present invention, the terminal may not need to set a program for loading a Chinese font in the second operating environment, thereby reducing processing complexity of the terminal in the second operating environment.

According to the user interface display method for a terminal provided in this embodiment of the present invention, a terminal generates, in a first operating environment, a first user interface that includes a first input component, obtains a first user interface picture according to the first user interface, and after determining attribute information of the first input component according to a first application, switches to a second operating environment and displays a second user interface according to the first user interface picture and the attribute information of the first input component. The second user interface includes the first user interface picture and a second input component located on the first user interface picture. According to the method provided in this embodiment of the present invention, shared memory occupied by a Chinese font in the prior art when the second user interface is rendered in the second operating environment is reduced drastically. In addition, because the first user interface picture is real mapping from the first user interface in the first operating environment and may be exactly the same as the first user interface in terms of similarity, the first user interface displayed in the first operating environment in this embodiment is highly restored when being displayed in the second operating environment. In this way, the user interfaces perceived by a user are relatively consistent, and intelligence of human-machine interaction is improved.

Figure 4:
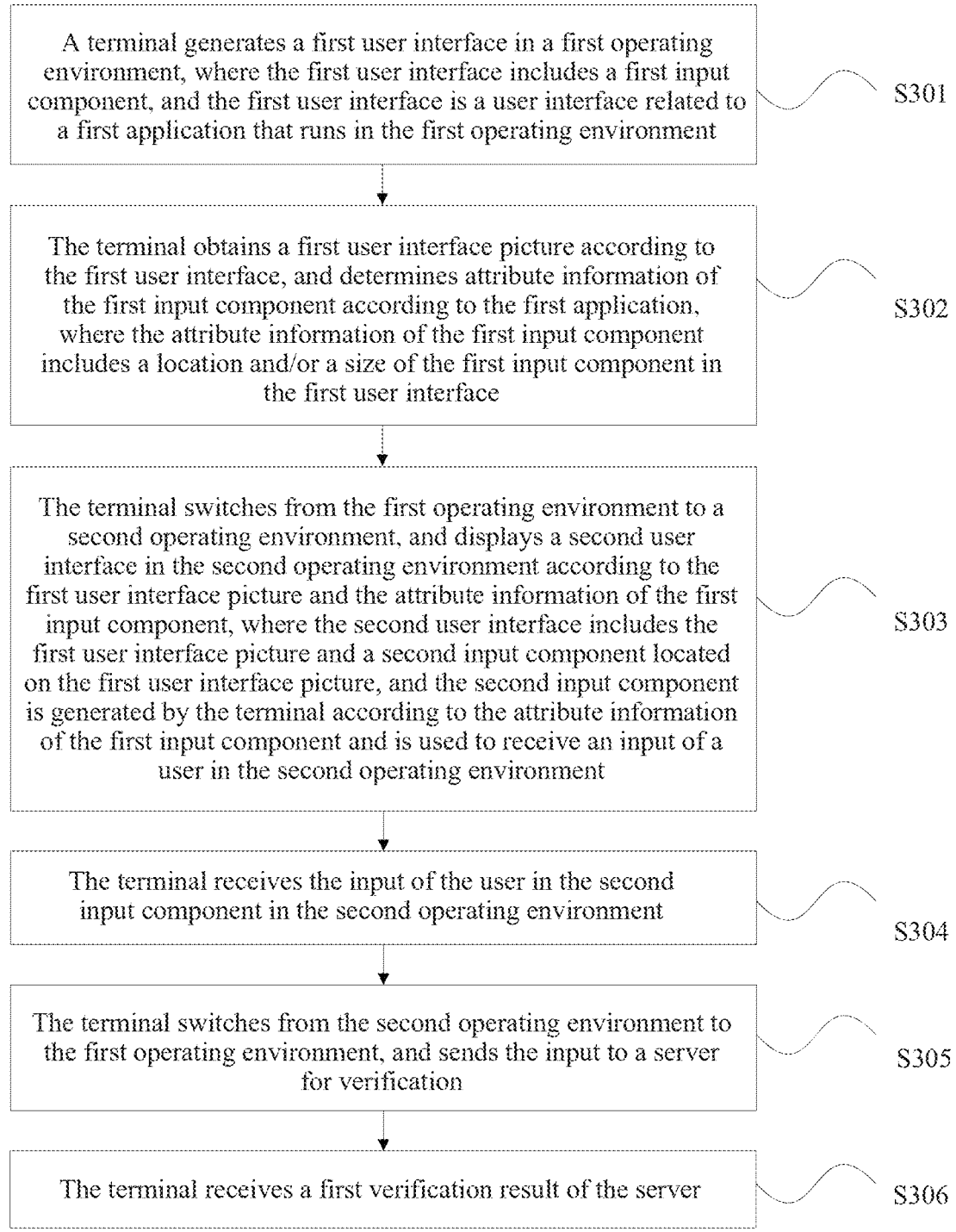
FIG. 4 is a schematic flowchart of Embodiment 2 of a user interface display method for a terminal according to the present invention.

FIG. 4 is a schematic flowchart of Embodiment 2 of a user interface display method for a terminal according to the present invention. This embodiment relates to a specific process in which a terminal constructs a second user interface in a second operating environment according to a first user interface in a first operating environment, and verifies a user identity in combination with a server according to an input of a user in a second input component of the second user interface. As shown in FIG. 4, the method includes the following steps.

S301. A terminal generates a first user interface in the first operating environment, where the first user interface includes a first input component, and the first user interface is a user interface related to a first application that runs in the first operating environment.

Specifically, in this embodiment, the first user interface may be in a displayed state, or may be in an invisible state. For a specific implementation process of S301, refer to S101 and corresponding descriptions in the first possible implementation manner or the second possible implementation manner in Embodiment 1, and details are not described herein again.

S302. The terminal obtains a first user interface picture according to the first user interface, and determines attribute information of the first input component according to the first application, where the attribute information of the first input component includes a location and/or a size of the first input component in the first user interface.

Specifically, for a specific implementation process of S302, refer to S102 and corresponding descriptions in the first possible implementation manner or the second possible implementation manner in Embodiment 1, and details are not described herein again.

S303. The terminal switches from the first operating environment to the second operating environment, and displays a second user interface in the second operating environment according to the first user interface picture and the attribute information of the first input component, where the second user interface includes the first user interface picture and a second input component located on the first user interface picture, and the second input component is generated by the terminal according to the attribute information of the first input component and is used to receive an input of a user in the second operating environment.

Specifically, for a specific implementation process of S303, refer to S103 and corresponding descriptions in the first possible implementation manner or the second possible implementation manner or the third possible implementation manner in Embodiment 1, and details are not described herein again.

S304. The terminal receives the input of the user in the second input component in the second operating environment.

Specifically, after displaying the second user interface to the user in the second operating environment, the terminal may optionally use a breathing light on the terminal to blink or change colors to notify the user that the second user interface is currently located in the second operating environment, or use vibration rhythm or vibration intensity of a vibration motor on the terminal to notify the user that the second user interface is currently located in the second operating environment, or use other means to notify the user that the second user interface is currently located in the second operating environment. The means used by the terminal to notify the user that the second user interface is located in the second operating environment is not limited in this embodiment of the present invention. After receiving notification of the terminal, the user performs a corresponding input in the second input component in the second user interface.

S305. The terminal switches from the second operating environment to the first operating environment, and sends the input to a server for verification.

Specifically, when the terminal detects the input of the user in the second input component in the second user interface, the terminal switches to the first operating environment. That is, a processor on the terminal has switched from the second operating environment to the second operating environment currently, and the processor currently works in the second operating environment. After switching to the first operating environment, the terminal sends the input of the user in the second input component to the server for verification. Optionally, to ensure security of information that is entered by the user in the second input component in the second operating environment and prevent the information from being stolen by a malicious application that runs in the first operating environment, the terminal encrypts the user input information in the second operating environment when switching to the first operating environment. That is, before switching to the first operating environment, the terminal encrypts the information that is entered by the user in the second operating environment.

For example, when the first user interface is a normal login user interface (and the user has entered a network account such as a username in the login user interface), the second user interface constructed by the terminal in the second operating environment is also a login user interface. After performing an input (for example, entering a password) in the second input component in the second user interface, the terminal switches to the first operating environment, and sends a login request to the server. The login request may carry the network account of the user and the input of the user in the second input component, so that the server can verify the user identity according to the login request, that is, verify whether the user input in the second input component matches information such as a private key or a password stored on the server. If the user input matches the information, the server determines that the user input in the second input component is correct, and the server sends a first verification result to the terminal.

For another example, when the first user interface is the payment user interface shown in FIG. 3, the second user interface constructed by the terminal in the second operating environment is also a payment user interface, and the second user interface includes the first user interface picture generated by the terminal according to the first user interface and the second input component located on the first user interface picture. After the user performs an input in the second input component in the second user interface, the terminal switches to the first operating environment, and sends a verification request to the server. The verification request carries the user input in the second input component, so that the server can perform verification according to the verification request.

S306. The terminal receives a first verification result of the server.

According to the user interface display method for a terminal provided in this embodiment of the present invention, shared memory occupied by a Chinese font in the prior art when a second user interface is rendered in a second operating environment is reduced drastically. In addition, because a first user interface picture is real mapping from a first user interface in a first operating environment and may be exactly the same as the first user interface in terms of similarity, the first user interface displayed in the first operating environment in this embodiment is highly restored when being displayed in the second operating environment. In this way, the user interfaces perceived by a user are relatively consistent, and intelligence of human-machine interaction is improved. In addition, the user enters corresponding security-sensitive information in a second input component in the second user interface in the second operating environment, and then the information is verified by the server, thereby protecting user privacy security.

Figure 5:
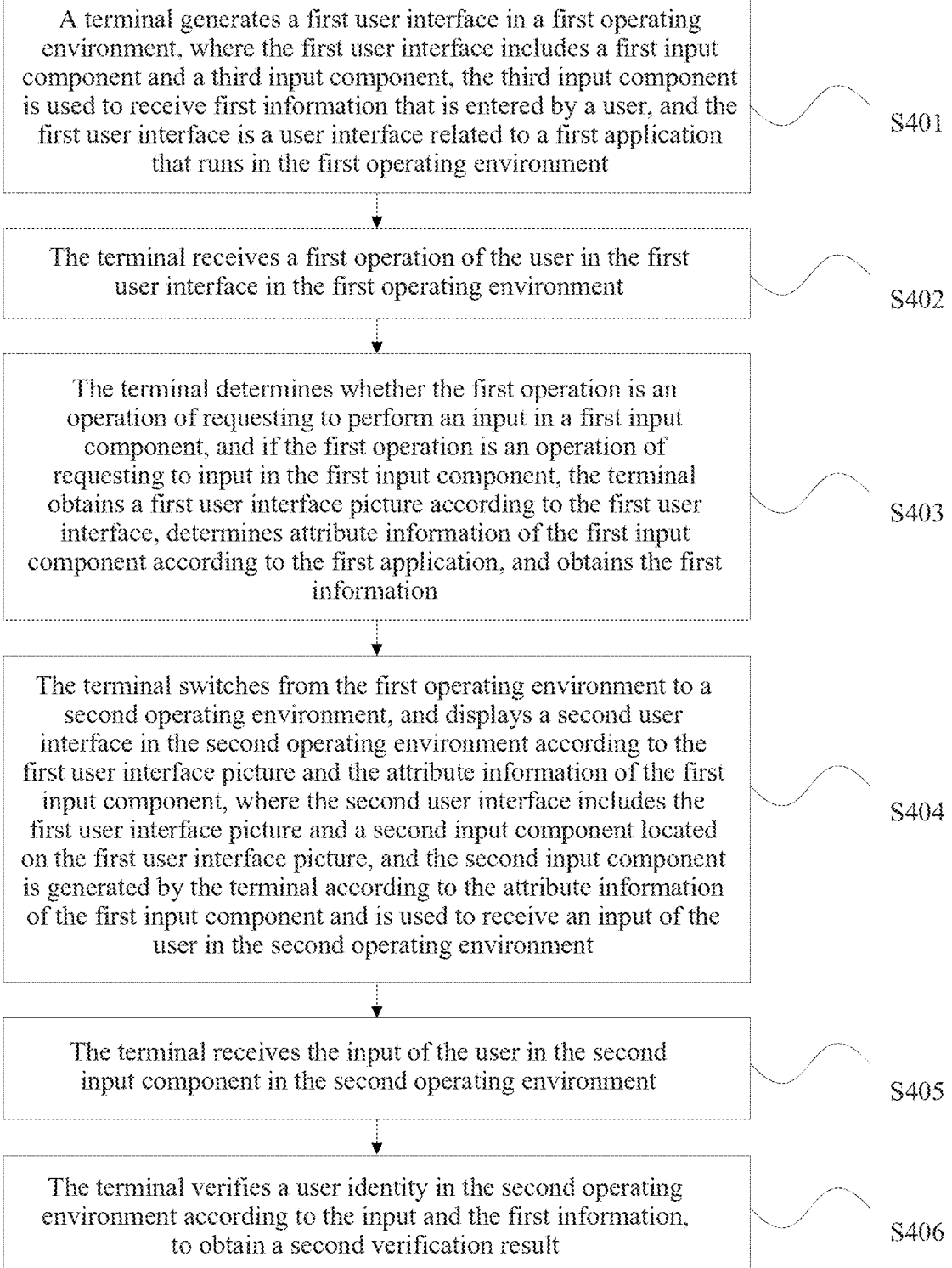
FIG. 5 is a schematic flowchart of Embodiment 3 of a user interface display method for a terminal according to the present invention.

FIG. 5 is a schematic flowchart of Embodiment 3 of a user interface display method for a terminal according to the present invention. This embodiment relates to a specific process in which a terminal constructs a second user interface in a second operating environment according to a first user interface in a first operating environment, and verifies a user identity in the terminal locally according to an input of a user in a second input component of the second user interface. As shown in FIG. 5, the method includes the following steps.

S401. A terminal generates a first user interface in the first operating environment, where the first user interface includes a first input component and a third input component, the third input component is used to receive first information that is entered by a user, and the first user interface is a user interface related to a first application that runs in the first operating environment.

Specifically, in this embodiment, the first user interface includes not only the first input component, but also the third input component. In addition, in this embodiment, the first user interface is in a displayed state. The third input component may be used to receive the first information that is entered by the user. Optionally, if the generated first user interface is a login user interface of a network account of the user, the first input component is a password input area in the login user interface, and the third input component is an area for inputting a network account such as a username in the login user interface. That is, the first information may be information related to the input of the user in the second input component.

Figure 2:
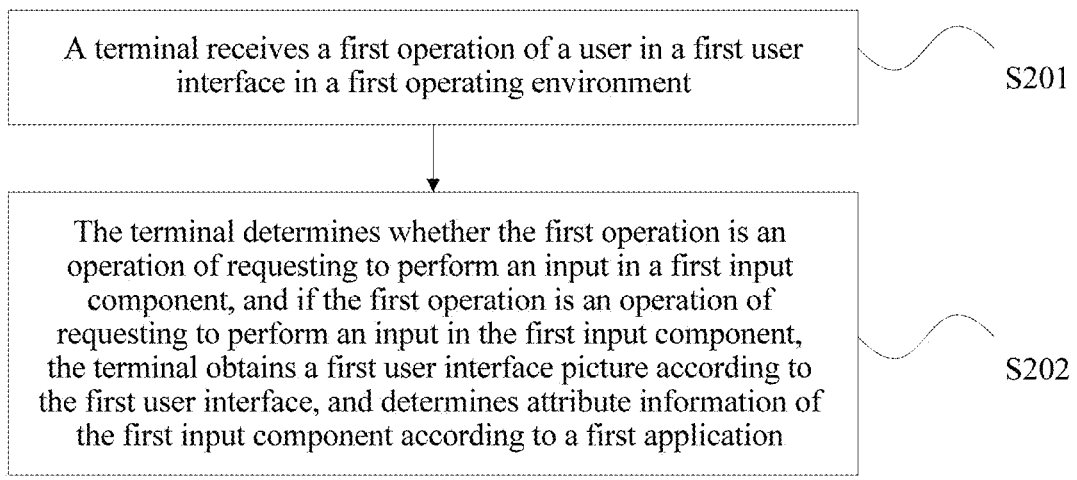
FIG. 2 is a schematic flowchart of an implementation manner of Embodiment 1 of a user interface display method for a terminal according to the present invention.

In addition, for a specific implementation process of generating the first user interface in step S401, refer to S101 and a corresponding description of the implementation manner shown in FIG. 2, and details are not described herein again.

S402. The terminal receives a first operation of the user in the first user interface in the first operating environment.

S403. The terminal determines whether the first operation is an operation of requesting to input in the first input component, and if the first operation is an operation of requesting to input in the first input component, the terminal obtains the first user interface picture according to the first user interface, determines attribute information of the first input component according to the first application, and obtains the first information.

Specifically, for a specific implementation process of S402 and S403, refer to the foregoing implementation manner shown in FIG. 2, and details are not described herein again. It should be noted that the first user interface picture in this embodiment also needs to include the third input component. Further, this step differs from the foregoing embodiment in that the terminal obtains the first information in the third input component after determining that the first operation is an operation of requesting to input in the first input component.

S404. The terminal switches from the first operating environment to the second operating environment, and displays a second user interface in the second operating environment according to the first user interface picture and the attribute information of the first input component, where the second user interface includes the first user interface picture and a second input component located on the first user interface picture, and the second input component is generated by the terminal according to the attribute information of the first input component and is used to receive an input of the user in the second operating environment.

Specifically, for a specific implementation process of S404, refer to the implementation process of S103, and details are not described herein again.

S405. The terminal receives the input of the user in the second input component in the second operating environment.

Specifically, after displaying the second user interface to the user in the second operating environment, the terminal may optionally use a breathing light on the terminal to blink or change colors to notify the user that the second user interface is currently located in the second operating environment, or use vibration rhythm or vibration intensity of a vibration motor on the terminal to notify the user that the second user interface is currently located in the second operating environment, or use other means to notify the user that the second user interface is currently located in the second operating environment. The means used by the terminal to notify the user that the second user interface is located in the second operating environment is not limited in this embodiment of the present invention. After receiving notification of the terminal, the user performs a corresponding input in the second input component in the second user interface.

S406. The terminal verifies a user identity in the second operating environment according to the input and the first information, to obtain a second verification result.

Specifically, a difference from the embodiment shown in FIG. 5 lies in that in this embodiment, after obtaining the input of the user in the second input component, the terminal does not switch to the first operating environment nor perform verification by using a server, but continues to verify the user identity and obtain the second verification result in the second operating environment according to the input of the user in the second input component and the obtained first information. That is, in the second operating environment, the terminal itself completes verifying the user identity, thereby further ensuring user privacy security.

According to the user interface display method for a terminal provided in this embodiment of the present invention, shared memory occupied by a Chinese font in the prior art when a second user interface is rendered in a second operating environment is reduced drastically. In addition, because a first user interface picture is real mapping from a first user interface in a first operating environment and may be exactly the same as the first user interface in terms of similarity, the first user interface displayed in the first operating environment in this embodiment is highly restored when being displayed in the second operating environment. In this way, the user interfaces perceived by a user are relatively consistent, and intelligence of human-machine interaction is improved. In addition, the user enters corresponding security-sensitive information in a second input component in the second user interface in the second operating environment, and the terminal performs verification in the second operating environment according to the input of the user in the second input component and the first information that is entered by the user in the third input component, thereby further protecting user privacy security.

Figure 6:
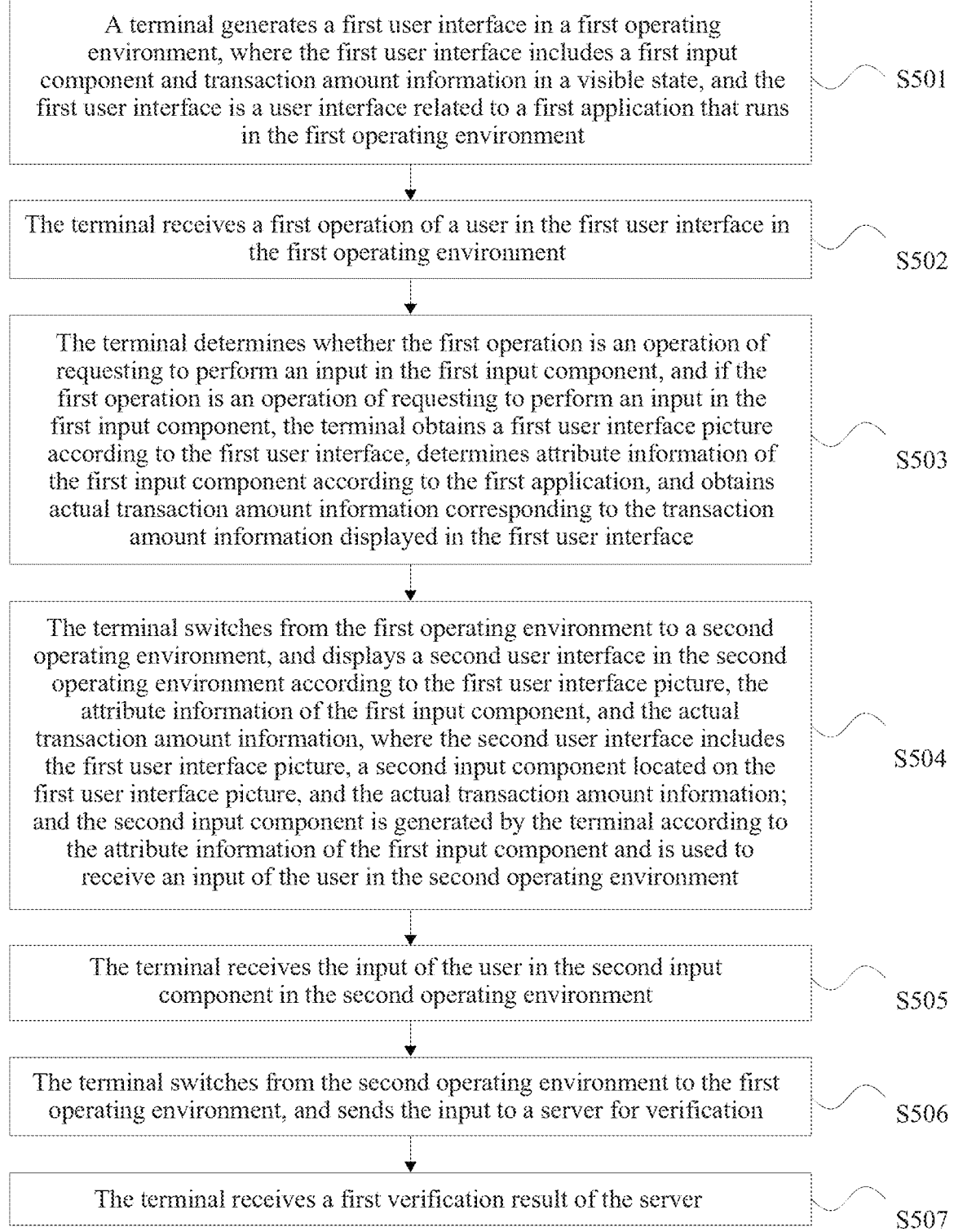
FIG. 6 is a schematic flowchart of Embodiment 4 of a user interface display method for a terminal according to the present invention.

FIG. 6 is a schematic flowchart of Embodiment 4 of a user interface display method for a terminal according to the present invention. This embodiment relates to a specific process in which a terminal constructs a second user interface in a second operating environment according to a first user interface in a first operating environment and displays, in the second user interface, actual transaction amount information corresponding to transaction amount information displayed in the first user interface, so as to prevent a malicious user from falsifying the actual transaction amount information. The falsification leads to a consequence of displaying false transaction amount information to the user. As shown in FIG. 6, the method includes the following steps.

S501. A terminal generates a first user interface in the first operating environment, where the first user interface includes a first input component and transaction amount information in a visible state, and the first user interface is a user interface related to a first application that runs in the first operating environment.

Specifically, in this embodiment, in the first operating environment, the first user interface is in a displayed state, so that transaction amount information is displayed to the user. It should be noted that the transaction amount information displayed by the terminal in the first user interface is determined by amount information in a corresponding configuration file at a bottom layer (for example, determined by the transaction amount information in a memory). That is, if a transaction amount in the configuration file at the bottom layer is 50 yuan, the transaction amount displayed in the first user interface is 50 yuan. In addition, for a specific implementation process of generating the first user interface in step S501, refer to S101 and a corresponding description of the implementation manner shown in FIG. 2, and details are not described herein again.

S502. The terminal receives a first operation of a user in the first user interface in the first operating environment.

S503. The terminal determines whether the first operation is an operation of requesting to input in the first input component, and if the first operation is an operation of requesting to input in the first input component, the terminal obtains the first user interface picture according to the first user interface, determines attribute information of the first input component according to the first application, and obtains actual transaction amount information corresponding to the transaction amount information displayed in the first user interface.

Specifically, for a specific implementation process of S502 and S503, refer to the foregoing implementation manner shown in FIG. 2, and details are not described herein again. It should be noted that in this embodiment, when obtaining the first user interface picture, the terminal also needs to obtain the actual transaction amount information that is in the configuration file at the bottom layer and is corresponding to the transaction amount information in the first user interface. Optionally, in the obtained first user interface picture, the transaction amount information displayed in the first user interface may be displayed or not displayed in the first user interface picture. This is not limited in this embodiment of the present invention.

S504. The terminal switches from the first operating environment to the second operating environment, and displays the second user interface in the second operating environment according to the first user interface picture, the attribute information of the first input component, and the actual transaction amount information, where the second user interface includes the first user interface picture, a second input component located on the first user interface picture, and the actual transaction amount information; and the second input component is generated by the terminal according to the attribute information of the first input component and is used to receive an input of the user in the second operating environment.

Specifically, after the terminal generates the first user interface picture, the terminal switches from the first operating environment to the second operating environment. It should be noted that "switching" mentioned herein may be: a processor on the terminal currently runs in the second operating environment, or may be: current user interface display of the terminal is controlled by the second operating environment. In this step, when the terminal switches from the first operating environment to the second operating environment, the first user interface picture equivalently switches from the first operating environment to the second operating environment. Optionally, the first user interface picture may be located in memory of the second operating environment, or may be located in shared memory of the first operating environment and the second operating environment.

Subsequently, the terminal may invoke the first user interface picture from the shared memory or the memory of the second operating environment, and display the first user interface picture in the second operating environment. At the same time, the terminal generates the second input component according to the attribute information of the first input component, and displays the second input component on the first user interface picture and also displays the actual transaction amount information on the first user interface picture to form the second user interface. The second input component is used to receive an input of the user in the second operating environment. It should be noted that when the transaction amount information displayed in the first user interface is not displayed in the first user interface picture, the actual transaction amount information may be displayed in an appropriate user interface location in the second user interface; or if the transaction amount information displayed in the first user interface is displayed in the first user interface picture, the actual transaction amount information overwrites, during construction of the second user interface, the transaction amount information in the first user interface that is displayed in the first user interface picture.

S505. The terminal receives the input of the user in the second input component in the second operating environment.

Specifically, after displaying the second user interface to the user in the second operating environment, the terminal may optionally use a breathing light on the terminal to blink or change colors to notify the user that the second user interface is currently located in the second operating environment, or use vibration rhythm or vibration intensity of a vibration motor on the terminal to notify the user that the second user interface is currently located in the second operating environment, or use other means to notify the user that the second user interface is currently located in the second operating environment. The means used by the terminal to notify the user that the second user interface is located in the second operating environment is not limited in this embodiment of the present invention. After receiving notification of the terminal, the user performs a corresponding input in the second input component in the second user interface.

S506. The terminal switches from the second operating environment to the first operating environment, and sends the input to a server for verification.

Specifically, when the terminal detects the input of the user in the second input component in the second user interface, the terminal switches to the first operating environment. That is, a processor on the terminal has switched from the second operating environment to the second operating environment currently, and the processor currently works in the second operating environment. After switching to the first operating environment, the terminal sends the input of the user in the second input component to the server for verification.

S507. The terminal receives a first verification result of the server.

According to the user interface display method for a terminal provided in this embodiment of the present invention, shared memory occupied by a Chinese font in the prior art when a second user interface is rendered in a second operating environment is reduced drastically. In addition, because a first user interface picture is real mapping from a first user interface in a first operating environment and may be exactly the same as the first user interface in terms of similarity, the first user interface displayed in the first operating environment in this embodiment is highly restored when being displayed in the second operating environment. In this way, the user interfaces perceived by a user are relatively consistent, and intelligence of human-machine interaction is improved. In addition, actual transaction amount information is displayed in the second user interface in the second operating environment to prevent a malicious user from falsifying the actual transaction amount information and further protect security of user property privacy. The falsification leads to a consequence of displaying false transaction amount information to the user.

A person of ordinary skill in the art may understand that all or some of the steps of the method embodiments may be implemented by a program instructing related hardware. The foregoing program may be stored in a computer readable storage medium. When the program is executed, the steps of the method embodiments are performed. The foregoing storage medium includes: any medium that can store program code, such as a ROM, a RAM, a magnetic disk, or an optical disc.

Figure 7:
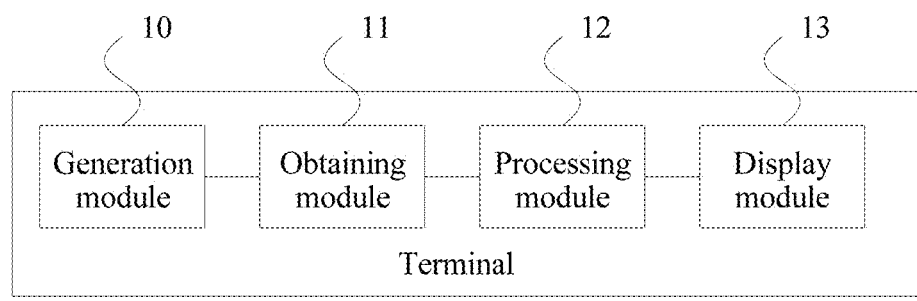
FIG. 7 is a schematic structural diagram of Embodiment 1 of a terminal according to the present invention.

FIG. 7 is a schematic structural diagram of Embodiment 1 of a terminal according to the present invention. A first operating environment and a second operating environment are deployed on the terminal. As shown in FIG. 7, the terminal includes a generation module 10, an obtaining module 11, a processing module 12, and a display module 13.

The generation module 10 is configured to generate a first user interface in the first operating environment. The first user interface includes a first input component, and the first user interface is a user interface related to a first application that runs in the first operating environment.

The obtaining module 11 is configured to obtain a first user interface picture according to the first user interface, and determine attribute information of the first input component according to the first application. The attribute information of the first input component includes a location and/or a size of the first input component in the first user interface.

The processing module 12 is configured to switch the terminal from the first operating environment to the second operating environment.

The display module 13 is configured to display a second user interface in the second operating environment according to the first user interface picture and the attribute information of the first input component. The second user interface includes the first user interface picture and a second input component located on the first user interface picture, and the second input component is generated by the terminal according to the attribute information of the first input component and is used to receive an input of a user in the second operating environment.

The terminal provided in this embodiment of the present invention can implement the foregoing method embodiments. Implementation principles and technical effects of the terminal are similar, and are not described in detail herein.

Further, the generation module 10 is specifically configured to generate a first user interface in a displayed state in the first operating environment; or generate, by the terminal, a first user interface in an invisible state in the first operating environment.

Figure 8:
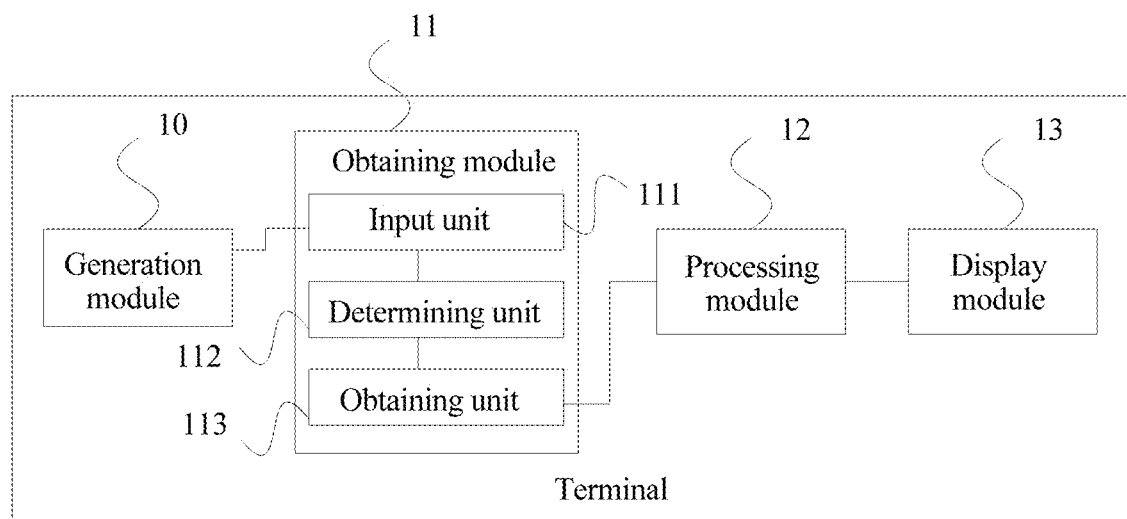
FIG. 8 is a schematic structural diagram of Embodiment 2 of a terminal according to the present invention.

FIG. 8 is a schematic structural diagram of Embodiment 2 of a terminal according to the present invention. On the basis of the embodiment shown in FIG. 7, further, if the generation module 10 generates the first user interface in the displayed state in the first operating environment, as shown in FIG. 8, the obtaining module 11 specifically includes an input unit 111, a determining unit 112, and an obtaining unit 113.

The input unit 111 is configured to receive a first operation of the user in the first user interface in the first operating environment.

The determining unit 112 is configured to determine whether the first operation is an operation of requesting to input in the first input component.

The obtaining unit 113 is configured to: after the determining unit 112 determines that the first operation is an operation of requesting to input in the first input component, obtain the first user interface picture according to the first user interface, and determine attribute information of the first input component according to the first application.

Further, the first user interface picture includes an overall screenshot of the first user interface or a partial screenshot of the first user interface.

Further, the second input component does not include a Chinese character, and the input of the user does not include a Chinese character.

Figure 9:
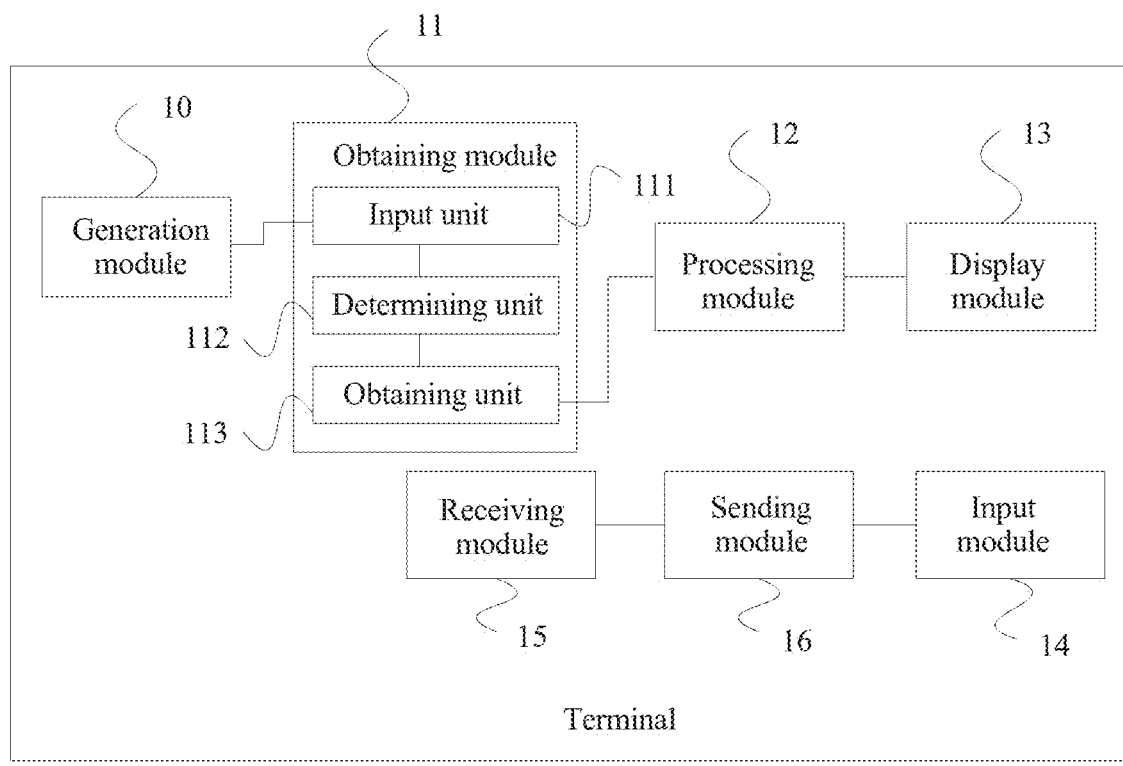
FIG. 9 is a schematic structural diagram of Embodiment 3 of a terminal according to the present invention.

FIG. 9 is a schematic structural diagram of Embodiment 3 of a terminal according to the present invention. On the basis of the embodiment shown in FIG. 7 or FIG. 8, further, the foregoing terminal may further include an input module 14, a receiving module 15, and a sending module 16.

The input module 14 is configured to receive an input of the user in the second input component in the second operating environment after the display module 13 displays the second user interface in the second operating environment.

The sending module 16 is configured to send the input to a server for verification after the processing module 12 switches the terminal from the second operating environment to the first operating environment.

The receiving module 15 is further configured to receive a first verification result of the server.

It should be noted that a structure of the terminal shown in FIG. 9 is based on the embodiment shown in FIG. 8. Certainly, FIG. 9 may also be based on the embodiment shown in FIG. 7, but this is not shown in this embodiment of the present invention.

Optionally, on the basis of the embodiment shown in FIG. 8 or FIG. 9, the first user interface further includes a third input component, the third input component is used to receive first information that is entered by the user; and the obtaining unit 113 is further configured to obtain the first information after the determining unit 112 determines that the first operation is an operation of requesting to input in the first input component. The input unit 111 is further configured to receive an input of the user in the second input component in the second operating environment after the display module 13 displays the second user interface in the second operating environment; and the obtaining unit 113 is further configured to verify a user identity in the second operating environment according to the input and the first information, to obtain a second verification result.

Optionally, on the basis of the embodiment shown in FIG. 8 or FIG. 9, the first user interface further includes transaction amount information in a visible state; the obtaining unit 113 is further configured to: after the determining unit 112 determines that the first operation is an operation of requesting to input in the first input component, obtain actual transaction amount information corresponding to the transaction amount information displayed in the first user interface; and the display module 13 is specifically configured to: after the processing module 12 switches the terminal from the first operating environment to the second operating environment, display the second user interface in the second operating environment according to the first user interface picture, the attribute information of the first input component, and the actual transaction amount information. The second user interface includes the first user interface picture, the second input component located on the first user interface picture, and the actual transaction amount information.

The terminal provided in this embodiment of the present invention can implement the foregoing method embodiments. Implementation principles and technical effects of the terminal are similar, and are not described in detail herein.

Figure 10:
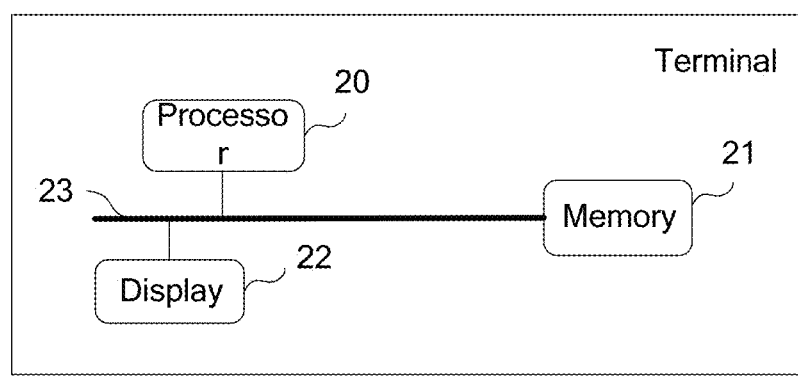
FIG. 10 is a schematic structural diagram of Embodiment 4 of a terminal according to the present invention.

FIG. 10 is a schematic structural diagram of Embodiment 4 of a terminal according to the present invention. A first operating environment and a second operating environment are deployed on the terminal. As shown in FIG. 10, the terminal may include a processor 20, a memory 21, a display 22, and at least one communications bus 23.

The processor 20 is a control center of the mobile terminal, is connected to all parts of the entire mobile terminal by using various interfaces and lines, and performs various functions of the mobile terminal and/or processes data by running or executing a software program and/or a module stored in the memory 21 and by invoking data stored in the memory 21. The processor 20 may be constituted by an integrated circuit (IC for short), for example, may be constituted by a single packaged IC, or may be constituted by connecting multiple packaged ICs that have a same function or different functions. For example, the processor 20 may include only a central processing unit (CPU for short), or may be a combination of a CPU, a digital signal processor (DSP for short), a graphic processing unit (GPU for short), and a control chip (such as a baseband chip) in a communications unit. In this embodiment of the present invention, the CPU may be a single computing core or may include multiple computing cores.

The memory 21 may be configured to store a software program and a module. The processor 20 executes various functional applications of the mobile terminal and implements data processing by running the software program and the module stored in the memory 21. The memory 21 mainly includes a program storage area and a data storage area. The program storage area may store an operating system and an application program required by at least one function, such as a sound play program or an image play program. The data storage area may store data (such as audio data and a phonebook) created according to use of the mobile terminal, and the like. In a specific implementation manner of the present invention, the memory 21 may include a volatile memory, for example, a nonvolatile dynamic random access memory (NVRAM for short), a phase change random access memory (PRAM for short), and a magnetoresistive random access memory (MRAM for short); or may include a nonvolatile memory, for example, at least one disc storage component, an electrically erasable programmable read-only memory (EEPROM for short), and a flash memory device such as a negative OR flash memory (NOR flash memory) or a negative AND flash memory (NAND flash memory). The nonvolatile memory stores an operating system and an application that are executed by the processor 20. The processor 20 loads, from the nonvolatile memory, a running program and data into a memory, and stores digital content into a mass storage apparatus.

The communications bus 23 is configured to implement communications connection between components.

Specifically, in this embodiment of the present invention, the processor 20 is configured to: generate a first user interface in the first operating environment, obtain a first user interface picture according to the first user interface, and after determining attribute information of a first input component according to a first application, switch the terminal from the first operating environment to the second operating environment. The first user interface includes the first input component, the first user interface is a user interface related to the first application that runs in the first operating environment, and the attribute information of the first input component of the terminal includes a location and/or a size of the first input component in the first user interface.

The display 22 is configured to display a second user interface in the second operating environment according to the first user interface picture and the attribute information of the first input component. The second user interface includes the first user interface picture and a second input component located on the first user interface picture, and the second input component is generated by the processor 20 according to the attribute information of the first input component and is used to receive an input of a user in the second operating environment.

The terminal provided in this embodiment of the present invention can implement the foregoing method embodiments. Implementation principles and technical effects of the terminal are similar, and are not described in detail herein.

Further, the processor 20 is specifically configured to generate a first user interface in a displayed state in the first operating environment; or generate, by the terminal, a first user interface in an invisible state in the first operating environment.

Figure 11:
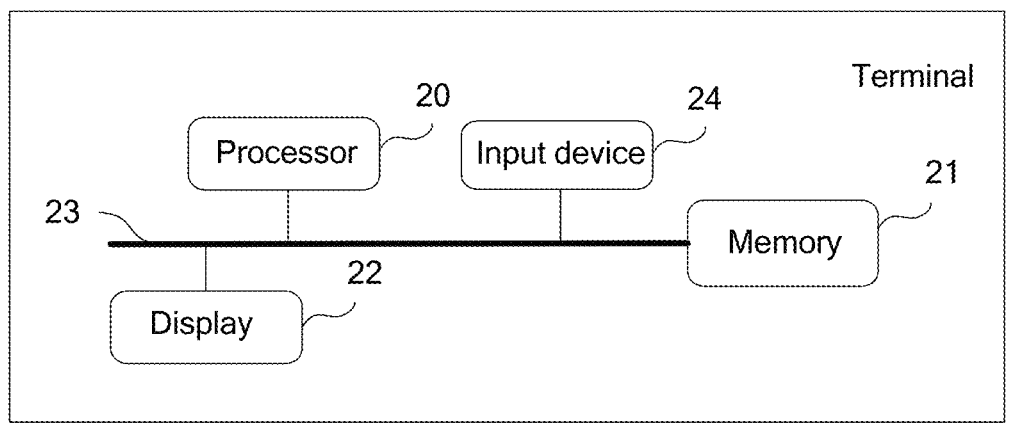
FIG. 11 is a schematic structural diagram of Embodiment 5 of a terminal according to the present invention.

FIG. 11 is a schematic structural diagram of Embodiment 5 of a terminal according to the present invention. If the processor 20 generates the first user interface in the displayed state in the first operating environment, the terminal may further include an input device 24 on the basis of the embodiment shown in FIG. 10.

The input device 24 is configured to implement interaction between a user and the mobile terminal, and/or is used by a user to enter information into the mobile terminal. For example, the input device 24 may receive digit or character information that is entered by the user, so as to generate a signal input related to user setting or function control. In a specific implementation manner of the present invention, the input device 24 may be a touch panel, or another human-machine interaction user interface, for example, a substantive input key or a microphone, or may be another external information pickup device, such as a camera. The touch panel, which is also referred to as a touchscreen or a touchscreen, can collect the user's operation action of touching or approaching the touch panel, for example, an action performed by the user on the touch panel or at a position near the touch panel by using a finger, a stylus, or any proper object or accessory, and drives a corresponding connection apparatus according to a preset program. Optionally, the touch panel may include two parts: a touch detection apparatus and a touch controller. The touch detection apparatus detects a touch operation of the user, converts the detected touch operation into an electrical signal, and transfers the electrical signal to the touch controller. The touch controller receives the electrical signal from the touch detection apparatus, converts the electrical signal into coordinates of a touch point, and sends the coordinates of the touch point to the processor 20. The touch controller may also receive and execute a command sent by the processor 20. In addition, the touch panel may be implemented in multiple styles, such as a resistive style, a capacitive style, an infrared (Infrared) ray, or a surface acoustic wave. In another implementation manners of the present invention, the substantive input key used by the input device 24 may include but is not limited to one or more of a physical keyboard, a functional key (such as a volume control key and an on/off key), a trackball, a mouse, an operating lever, or the like. The input device 24 in a form of a microphone can collect a voice that is input by the user or from an environment, and convert the voice into a command that is in an electrical signal form and executable by the processor 20. The input device 24 in a form of a fingerprint sensor can collect body surface texture information (including fingerprint information, palm print information, and the like) on a contact part between the user and the fingerprint sensor, and convert the information into a command that is in an electrical signal form and executable by the processor 20. The fingerprint sensor may be a capacitive fingerprint sensor, an ultrasonic fingerprint sensor, optical fingerprint sensor, a temperature fingerprint sensor, or the like, and may be a scratch-type fingerprint sensor or a push-type fingerprint sensor.

Specifically, in this embodiment of the present invention, the input device 24 is configured to receive a first operation of the user in the first user interface in the first operating environment.

The processor 20 is specifically configured to: determine whether the first operation is an operation of requesting to input in the first input component, and if the first operation is an operation of requesting to input in the first input component, obtain the first user interface picture according to the first user interface, and determine the attribute information of the first input component according to the first application.

Further, the first user interface picture includes an overall screenshot of the first user interface or a partial screenshot of the first user interface. The second input component does not include a Chinese character, and the input of the user does not include a Chinese character.

Figure 12:
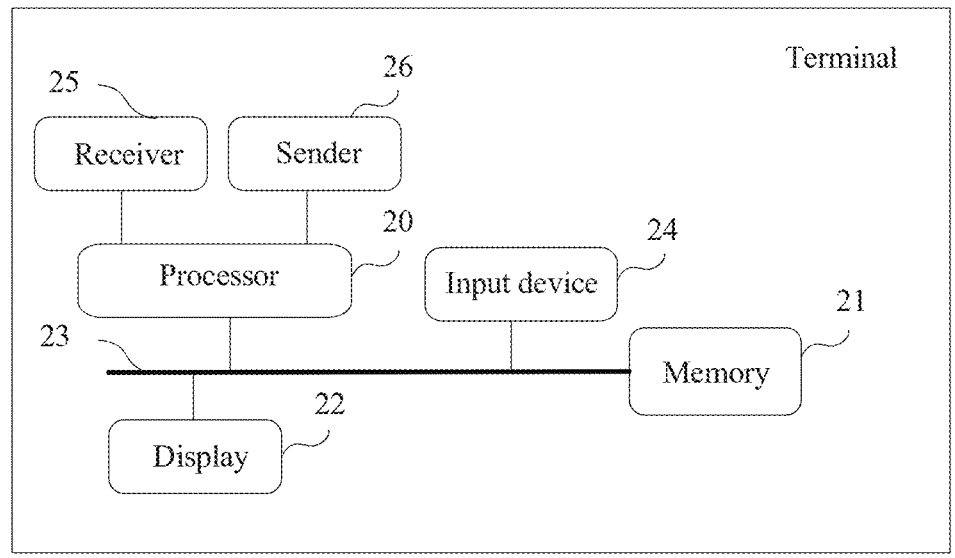
FIG. 12 is a schematic structural diagram of Embodiment 6 of a terminal according to the present invention.

FIG. 12 is a schematic structural diagram of Embodiment 6 of a terminal according to the present invention. On the basis of the embodiment shown in FIG. 10 or FIG. 11, the terminal further includes an input device 24, a receiver 25, and a sender 26.

The input device 24 is configured to receive an input of the user in the second input component in the second operating environment after the display 22 displays the second user interface in the second operating environment.

The sender 26 is configured to send the input to a server for verification after the processor 20 switches the terminal from the second operating environment to the first operating environment.

The receiver 25 is further configured to receive a first verification result of the server.

It should be noted that both the receiver 25 and the sender 26 may be located in a communications unit in the terminal, so that the terminal is connected to a communications peer by using the communications channel, and exchanges data with the communications peer by using the communications channel.

Optionally, the first user interface further includes a third input component, the third input component is used to receive first information that is entered by the user; and the processor 20 is further configured to obtain the first information after determining that the first operation is an operation of requesting to input in the first input component. Therefore, the input device 24 is further configured to receive an input of the user in the second input component in the second operating environment after the display 22 displays the second user interface in the second operating environment. The processor 20 is further configured to verify a user identity in the second operating environment according to the input and the first information, to obtain a second verification result.

Optionally, the first user interface further includes transaction amount information in a visible state. The processor 20 is further configured to: after determining that the first operation is an operation of requesting to input in the first input component, obtain actual transaction amount information corresponding to the transaction amount information displayed in the first user interface. The display 22 is specifically configured to: after the processor 20 switches the terminal from the first operating environment to the second operating environment, display the second user interface in the second operating environment according to the first user interface picture, the attribute information of the first input component, and the actual transaction amount information. The second user interface includes the first user interface picture, the second input component located on the first user interface picture, and the actual transaction amount information.

The terminal provided in this embodiment of the present invention can implement the foregoing method embodiments. Implementation principles and technical effects of the terminal are similar, and are not described in detail herein.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
generating, by a terminal, a first user interface in a first operating environment, wherein the first user interface comprises a first input component for receiving user input through the first user interface, and the first user interface is a user interface related to a first application that runs in the first operating environment, wherein the first operating environment and a second operating environment are deployed on the terminal, and wherein the first user interface comprises a first content displayed using a language font invoked from a memory;
upon detecting, by the terminal, an operation of a user to input information in the first input component of the first user interface in the first operating environment, obtaining, by the terminal, a first screenshot of the first user interface, the first screenshot comprising an screenshot of the first content displayed in the first user interface, and determining attribute information of the first input component according to the first application, wherein the attribute information of the first input component comprises a location and/or a size of the first input component in the first user interface; and switching, by the terminal, from the first operating environment to the second operating environment, generating, when switching to the second operating environment, a second user interface in the second operating environment using the first screenshot of the first user interface and the attribute information of the first input component, and displaying the second user interface in the second operating environment, wherein the second user interface comprises the first screenshot of the first user interface and a second input component located on the first screenshot of the first user interface for receiving an input of the user in the second operating environment, and the second input component is generated by the terminal according to the attribute information of the first input component, such that the second user interface reproduces the first user interface in the second operating environment without need of invoking the language font for displaying the first content of the first user interface in the second operating environment, and wherein the first operating environment is a rich execution environment (REE), and the second operating environment is a trusted execution environment (TEE); and wherein after displaying the second user interface in the second operating environment, the method further comprises:

receiving, by the terminal, a first input of the user in the second input component in the second operating environment;

switching, by the terminal, from the second operating environment to the first operating environment, and sending the first input to a server for verification; and receiving, by the terminal, a first verification result of the server.

2. The method according to claim 1, wherein generating, by the terminal, the first user interface in the first operating environment comprises:

generating, by the terminal, the first user interface in a displayed state in the first operating environment; or generating, by the terminal, the first user interface in an invisible state in the first operating environment.

3. The method according to claim 2, wherein the terminal generates the first user interface in the displayed state in the first operating environment, and obtaining, by the terminal, the first screenshot of the first user interface, and determining the attribute information of the first input component according to the first application comprises:

receiving, by the terminal, a first operation of the user in the first user interface in the first operating environment;

determining, by the terminal, whether the first operation is an operation of requesting to input in the first input component; and when the first operation is the operation of requesting to input in the first input component, obtaining, by the terminal, the first screenshot of the first user interface according to the first user interface, and determining the attribute information of the first input component according to the first application.

4. The method according to claim 3, wherein the first user interface further comprises transaction amount information in a visible state, and the method further comprises:

after the terminal determines that the first operation is the operation of requesting to input in the first input component, obtaining, by the terminal, actual transaction amount information corresponding to the transaction amount information displayed in the first user interface.

5. The method according to claim 4, wherein generating the second user interface comprises:

generating the second user interface in the second operating environment using the first screenshot of the first user interface, the attribute information of the first input component, and the actual transaction amount information, wherein the second user interface comprises the first screenshot of the first user interface, the second input component located on the first screenshot of the first user interface, and the actual transaction amount information.

6. The method according to claim 1, wherein the first screenshot of the first user interface comprises an overall screenshot of the first user interface or a partial screenshot of the first user interface.

7. The method according to claim 1, further comprising:

after detecting the operation of the user to input information in the first input component of the first user interface in the first operating environment, obtaining first information entered by the user through a third input component of the first user interface; and wherein after displaying, by the terminal, the second user interface in the second operating environment, the method further comprises:

receiving, by the terminal, a second input of the user in the second input component in the second operating environment; and verifying, by the terminal, a user identity in the second operating environment according to the second input and the first information, to obtain a second verification result.

8. A terminal, comprising:

a processor, configured to:

generate a first user interface in a first operating environment, the first user interface comprising a first content displayed using a language font invoked from a memory;

upon detecting an operation of a user to input information in a first input component of the first user interface in the first operating environment, obtain a first screenshot of the first user interface, the first screenshot comprising an screenshot of the first content displayed in the first user interface;

after determining attribute information of the first input component according to a first application, switch the terminal from the first operating environment to a second operating environment, wherein the first user interface comprises the first input component, the first user interface is related to the first application that runs in the first operating environment, the attribute information of the first input component of the terminal comprises a location and/or a size of the first input component in the first user interface, and the first operating environment and the second operating environment are deployed on the terminal, wherein the first operating environment is a rich execution environment (REE), and the second operating environment is a trusted execution environment (TEE); and generate, when switching to the second operating environment, a second user interface in the second operating environment using the first screenshot of the first user interface and the attribute information of the first input component, wherein the second user interface comprises the first screenshot of the first user interface and a second input component located on the first screenshot of the first user interface for receiving an input of the user in the second operating environment, and the second input component is generated by the processor according to the attribute information of the first input component, such that the second user interface reproduces the first user interface in the second operating environment without need of invoking the language font for displaying the first content of the first user interface in the second operating environment; and a display configured to display the second user interface in the second operating environment; and wherein the processor is further configured to:
receive a first input of the user in the second input component in the second operating environment after displaying the second user interface in the second operating environment;
send the first input to a server for verification after the processor switches from the second operating environment to the first operating environment; and
receive a first verification result of the server.

9. The terminal according to claim 8, wherein the processor is configured to generate the first user interface in a displayed state in the first operating environment; or generate, by the terminal, the first user interface in an invisible state in the first operating environment.

10. The terminal according to claim 9, wherein the processor generates the first user interface in the displayed state in the first operating environment, and the terminal further comprises an input device;
wherein the input device is configured to receive a first operation of the user in the first user interface in the first operating environment; and
wherein the processor is configured to:
determine whether the first operation is an operation of requesting to input in the first input component, and when the first operation is the operation of requesting to input in the first input component, obtain the first screenshot of the first user interface according to the first user interface, and determine the attribute information of the first input component according to the first application.

11. The terminal according to claim 10, wherein the first user interface further comprises a third input component, the third input component is used to receive first information that is entered by the user; and the processor is further configured to obtain the first information after determining that the first operation is the operation of requesting to input in the first input component.

12. The terminal according to claim 11, wherein the input device is further configured to receive an input of the user in the second input component in the second operating environment after the display displays the second user interface in the second operating environment; and
wherein the processor is further configured to verify a user identity in the second operating environment according to the input and the first information, to obtain a second verification result.

13. The terminal according to claim 10, wherein the first user interface further comprises transaction amount information in a visible state; and
wherein the processor is further configured to: after determining that the first operation is the operation of requesting to input in the first input component, obtain actual transaction amount information corresponding to the transaction amount information displayed in the first user interface.

14. The terminal according to claim 13, wherein the second user interface is generated in the second operating environment using the first screenshot of the first user interface, the attribute information of the first input component, and the actual transaction amount information, and wherein the second user interface comprises the first screenshot of the first user interface, the second input component located on the first screenshot of the first user interface, and the actual transaction amount information.

15. The terminal according to claim 8, wherein the first screenshot of the first user interface comprises an overall screenshot of the first user interface or a partial screenshot of the first user interface.

* * * * *